United States Statutory Invention Registration [19]

[11] Reg. Number: H594

Adorjan

[43] Published: Mar. 7, 1989

[54] JACKETED PIPELINE SYSTEM WITH PRESSURIZED GAS TO RESIST EXTERNAL STRESS

[75] Inventor: Alexander S. Adorjan, Pearland, Tex.

[73] Assignee: Exxon Production Research Company, Houston, Tex.

[21] Appl. No.: 722,646

[22] Filed: Apr. 12, 1985

[51] Int. Cl.[4] ..... F16L 9/14

[52] U.S. Cl. ..... 138/148; 138/113; 138/114; 138/149

[58] Field of Search ..... 138/148, 149, 113, 114, 138/116, 112

[56] References Cited

U.S. PATENT DOCUMENTS

| | | | |
|---|---|---|---|
| 2,572,062 | 10/1951 | Sexton | 138/148 |
| 2,592,574 | 4/1952 | Kaiser | 138/148 |
| 2,610,028 | 9/1952 | Smith | 138/148 |
| 3,213,889 | 10/1965 | Cotman | 138/149 |
| 3,319,431 | 5/1967 | Clarke et al. | 62/45 |
| 3,388,724 | 6/1968 | Mowell et al. | 138/149 |
| 3,410,313 | 11/1968 | Martin | 138/148 |
| 3,461,918 | 8/1969 | Gerner | 138/148 |
| 3,490,344 | 1/1970 | Archer et al. | 138/148 |
| 3,511,282 | 5/1970 | Willhite et al. | 138/113 |
| 3,547,161 | 12/1970 | Reece | 138/114 |
| 3,717,718 | 2/1973 | Schmidtchen | 138/114 |
| 3,831,636 | 8/1974 | Bittner | 138/114 |
| 3,866,670 | 2/1975 | Cramer et al. | 138/111 |
| 4,139,024 | 2/1979 | Adorjan | 138/149 |
| 4,303,105 | 12/1981 | Rohner | 138/149 |

FOREIGN PATENT DOCUMENTS

| | | | |
|---|---|---|---|
| 2040011 | 8/1980 | United Kingdom | 138/148 |

*Primary Examiner*—Stephen C. Buczinski
*Assistant Examiner*—Linda J. Wallace

[57] ABSTRACT

A pipeline system designed for withstanding elevated levels of pressure from external sources. Pressurized gas is introduced into an annulus between an outer pipe jacket and insulation material, which in turn surrounds a pipe, to supply structural support.

5 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

JACKETED PIPELINE SYSTEM WITH PRESSURIZED GAS TO RESIST EXTERNAL STRESS

BACKGROUND OF THE INVENTION

1. Field of the Invention

The invention relates to pipeline systems particularly designed for withstanding elevated external compressive loads. More particularly, the invention relates to pipeline systems capable of withstanding increased stresses of the type resulting from use as oil or gas carriers in a submarine environment or as a liquefied natural gas carrier.

2. Description of the Prior Art

Cost, ease of installation, and resistance to internal and external stresses are important factors in the design of pipeline systems. Oil pipelines, gas pipelines, or especially liquefied natural gas (hereinafter referred to as "LNG") pipeline systems and submarine pipeline systems, are particularly vulnerable to stresses as described below, and each type of system must be designed to withstand these stresses.

LNG is generally transported by pipe at temperatures of −160° C. Insulation material is conventionally used to maintain the low LNG temperature. Typically, the insulation material is surrounded by an outer pipe jacket made of material such as steel, plastic, or fiber reinforced plastic. The outer jacket serves to maintain the integrity of the insulation material, such as by protecting it from the ingress of water and water vapor, which would increase the thermal conductivity of the insulation. LNG pipelines are often placed in environments where they are subjected to elevated external compressive loads (for example, buried deep on the seafloor or underground), increasing the risk of jacket failure. Once the outer jacket has failed at one or more locations, the risk of water or water vapor penetrating the insulation is increased, resulting in an increase in the insulation's thermal conductivity and possible structural destruction of the insulation. The insulation's thermal conductivity can then be further increased by ice formation. Ingress of water or water vapor causes the outer jacket to be further weakened because the radical change in jacket temperature resulting from the increase in the insulation's thermal conductivity causes the lowering of jacket temperature and contraction of the jacket. Structural destruction of the insulation material may result. As the jacket is weakened, the likelihood of outer jacket failure, and the resulting ingress of water and water vapor, increases. Ultimately, ice builds up in the insulation, expanding to a volume where it destroys the outer jacket, leaving the LNG-carrying pipe exposed to the environment. An initial jacket failure can ultimately result in complete failure of the pipe itself, and finally, the escape of LNG into the environment.

For many applications, submarine pipeline systems must be able to withstand high external hydrostatic pressure since hydrostatic pressure increases at the rate of ½ pound per square inch per foot [approximately 10 kiloPascal (kPA) per meter] of water depth. For this reason, submarine pipeline systems conventionally are reinforced with an outer pipe jacket. Still, outer jackets are vulnerable to failure, especially when installed in sections. Small buckles which occur during installation can propagate along the jacket, causing collapse of the jacket, if the external hydrostatic pressure is greater than the initiation pressure (a function of the diameter to wall-thickness ratio and the jacket material grade). In order to handle elevated external hydrostatic pressures, conventional outer jackets are made of steel having large wall thickness. These solutions have disadvantages. Because conventional submarine pipelines typically have large diameters, increasing the density or thickness of the jacket material adds significantly to the cost and ease of installation of the system.

Jacketed pipelines for oil, gas and especially LNG often employ expansion bellows to withstand the thermal stress resulting from contrasting temperatures of the inner pipe and the outer jacket. The bellows, usually installed on the outer pipe jacket, do not totally prevent leakage, and destruction of the insulation material is still possible.

It is also conventional to use a denser insulation material in a submarine pipeline system than would be used for surface application, because more of the external compressive load can be supported. However, increasing the density of the insulation material results in an increase in thermal conductivity. So, while a large compressive load can be supported, the insulation will not be as effective.

The previously discussed problems associated with LNG pipelines are more severe for submarine LNG pipeline systems. The high external hydrostatic compressional load increases the risk that the outer jacket will leak and that the insulation will be flooded. The low temperature of the LNG carrying pipe aggravates the situation. The thermal conductivity of the insulation increases as water penetrates the outer jacket. As described above, the pipeline system can be destroyed as a result of ice formation inside the outer jacket.

It is an object of the present invention to provide an improved pipeline system capable of withstanding elevated external compressional loads, so that the risk of damage resulting from outer jacket failure is minimized.

SUMMARY OF THE INVENTION

According to this invention, pressurized gas is used to provide structural support to a pipeline system so that the system can withstand elevated external compressional loads, especially those present in submarine environments.

In a preferred embodiment, the pipeline system of the invention includes a pipe with insulation material encasing the pipe. An outer pipe jacket surrounds the insulation material, such that an annulus is provided between the jacket and the insulation. This annulus is filled with gas at a pressure greater than the external pressure expected to be exerted on the outer pipe jacket. The gas is selected from those available which will not condense at extremely low temperatures which also have sufficiently low thermal conductivity.

DESCRIPTION OF THE PREFERRED EMBODIMENT

Figure 1:
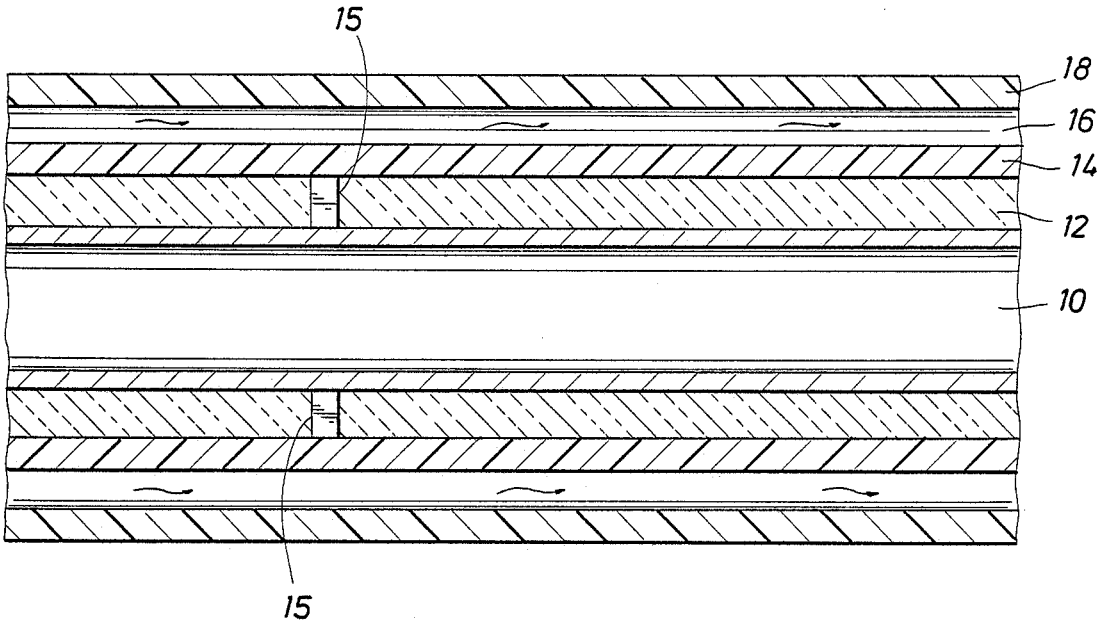
FIG. 1 is a longitudinal cross-sectional view of a length of a pipeline having pressurized gas in an annulus between its outer jacket and closed cell insulation material to provide structural support to the pipeline, showing a preferred embodiment of the invention.

The preferred embodiment may be understood with reference to FIG. 1. FIG. 1 is a longitudinal cross-sectional view of a length of pipe of the pipeline system of the invention. Pipe 10 is encased by insulation material 12. Vapor barrier 14, preferably composed of an impermeable material, encases and adheres to insulation material 12. Vapor barrier 14 keeps gas 16 from penetrating insulation material 12. Outer pipe jacket 18 surrounds vapor barrier 14 in such a manner that an annulus filled with gas 16 is provided between outer jacket 18 and vapor barrier 14. Vapor barrier 14 is centered in the system by braces such as 15.

Gas 16 is introduced to the pipeline system from a location on a ship or on shore. As discussed later in greater detail, gas 16 may be entirely one type of gas or a combination of gases. Preferably, the annulus will be evacuated, followed by introduction of gas 16 into the annulus at the desired pressure. For this technique of filling the annulus to succeed, the outer jacket must be able to structurally withstand external pressure while the annulus is evacuated. If this is not possible, or is deemed to be too high a risk, the annulus must be purged of undesired gas by having both ends of the pipeline open. Gas 16 is introduced into a first end to displace undesired gas, which exits the system through the second end. When all undesired gas has been displaced from the annulus (so that the annulus contains substantially only gas 16), the second end is sealed and the pressure of gas 16 increased to the desired level.

Figure 2:
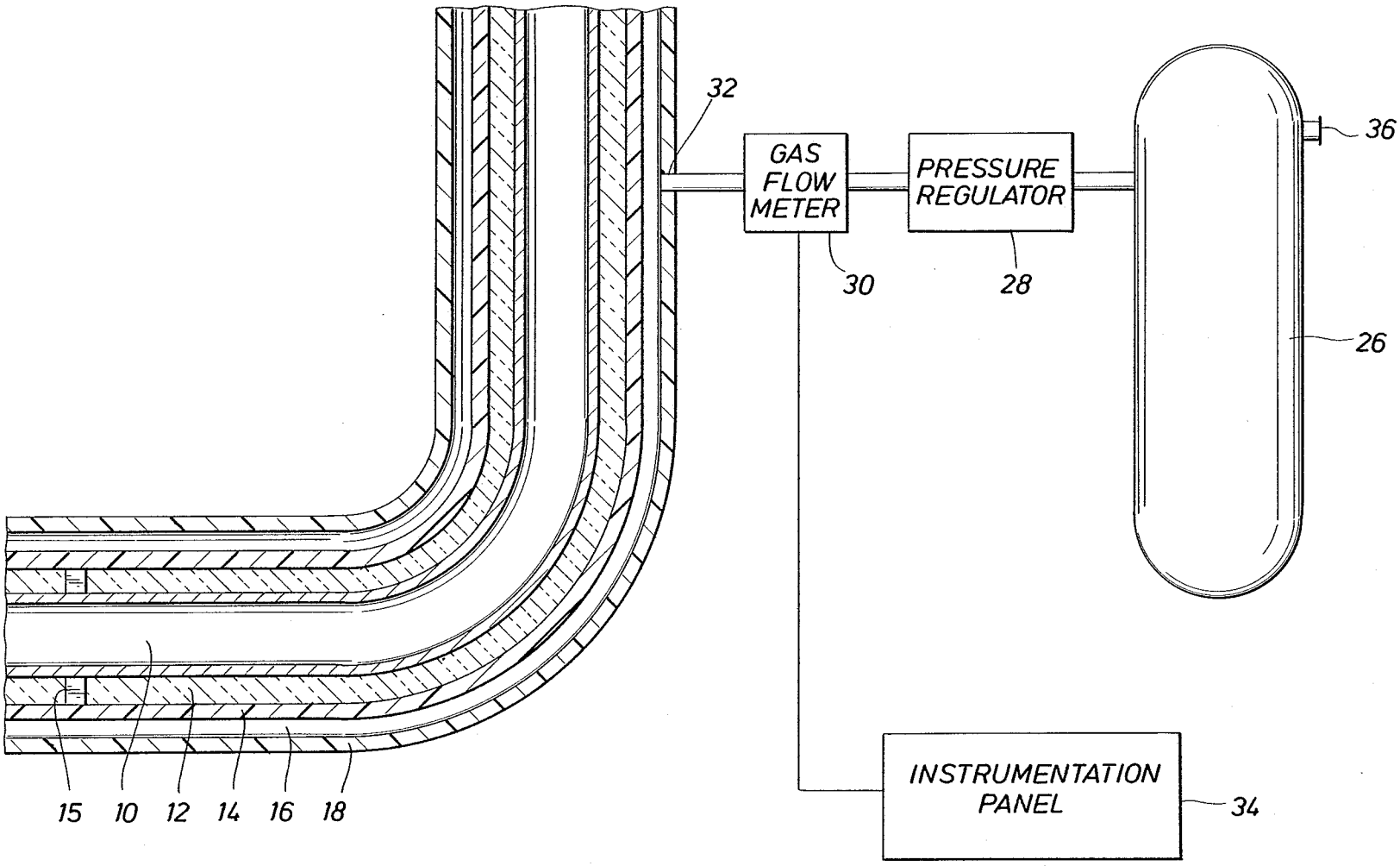
FIG. 2 is a partial perspective, partial longitudinal cross-sectional view of a length of pipeline that is attached to means for the supply and maintenance of pressurized gas.

FIG. 2 is a partial perspective, partial cross-sectional view of the system used to supply gas to and regulate the pressure of the pipeline system. Supply tank 26 contains gas 16. Pressure regulator 28, is used to read the gas pressure in the annulus. If the pressure decreases, gas 16 will be directed into the annulus at entrance 32 at a level sufficient to maintain the desired pressure. Gas flowmeter 30 will regulate the amount of gas allowed to enter the annulus. Instrumentation panel 34 may be used to indicate the amount of gas needed to maintain the desired pressure, allowing determination of the severity of a leak. Supply tank 26 can be replenished with gas 16 at gas resupply connector 36. Thus, it can be decided if repair is needed.

Insulation material 12 must be capable of withstanding the increased pressure from gas 16 surrounding it. Insulation material 12 is accordingly selected so that it has sufficient compressive strength to prevent its collapse subjected to the pressure exerted by gas 16. Most suitable insulation materials will have a high density, since compressive strength increases proportionally with density increases.

Open cell insulation material may be preferred in some applications. An open cell insulation material equalizes pressure distribution through the annulus faster, lessening the risk of insulation collapse. Open cell insulation is designed so that gas can flow through the insulation's cells and the pressure throughout the annulus and insulation material is equalized. No discrete annulus will be formed. In contrast, closed cell insulation is slower to equalize the pressure of the surrounding gases.

When closed cell insulation is used, it should be encapsulated by vapor barrier 14 to prevent the ingress or egress of gas or water. Vapor barrier 14 helps to maintain the thermal conductivity of insulation material 12 at a generally constant level.

Figure 3:
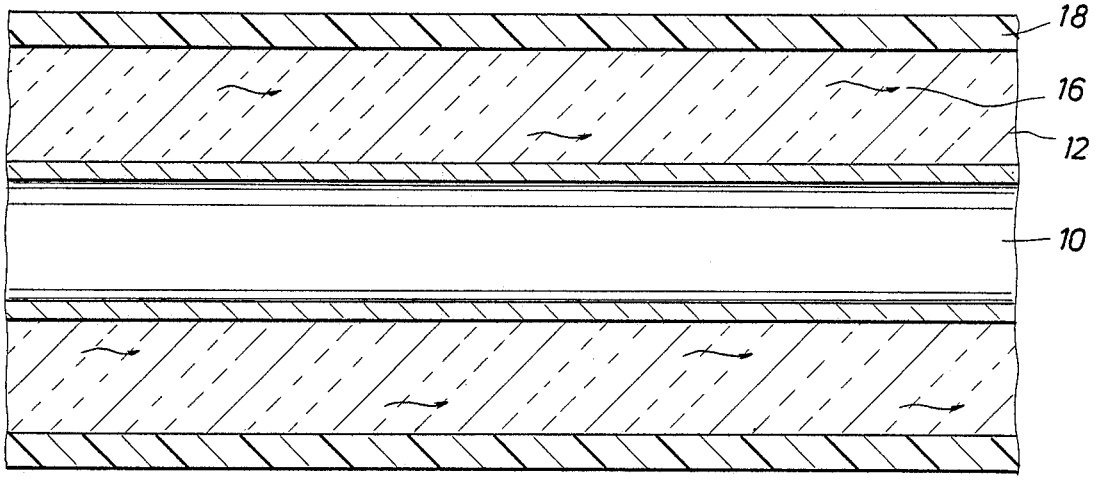
FIG. 3 is a longitudinal cross-sectional view of a length of pipeline having open cell insulation.
Figure 4:
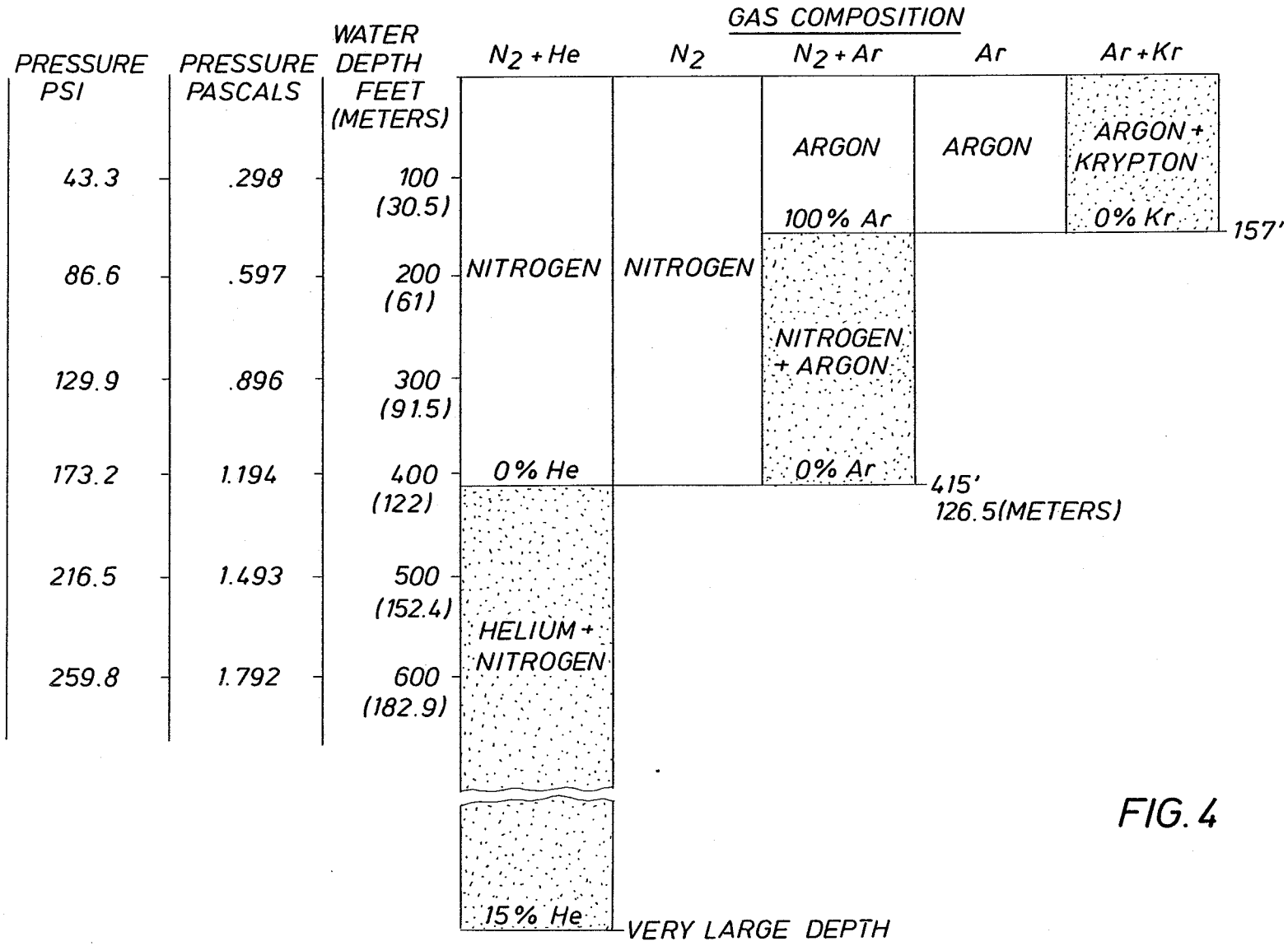
FIG. 4 is a chart showing the pressure and water depth at which selected gases, and combinations of gases, condense.
Figure 5:
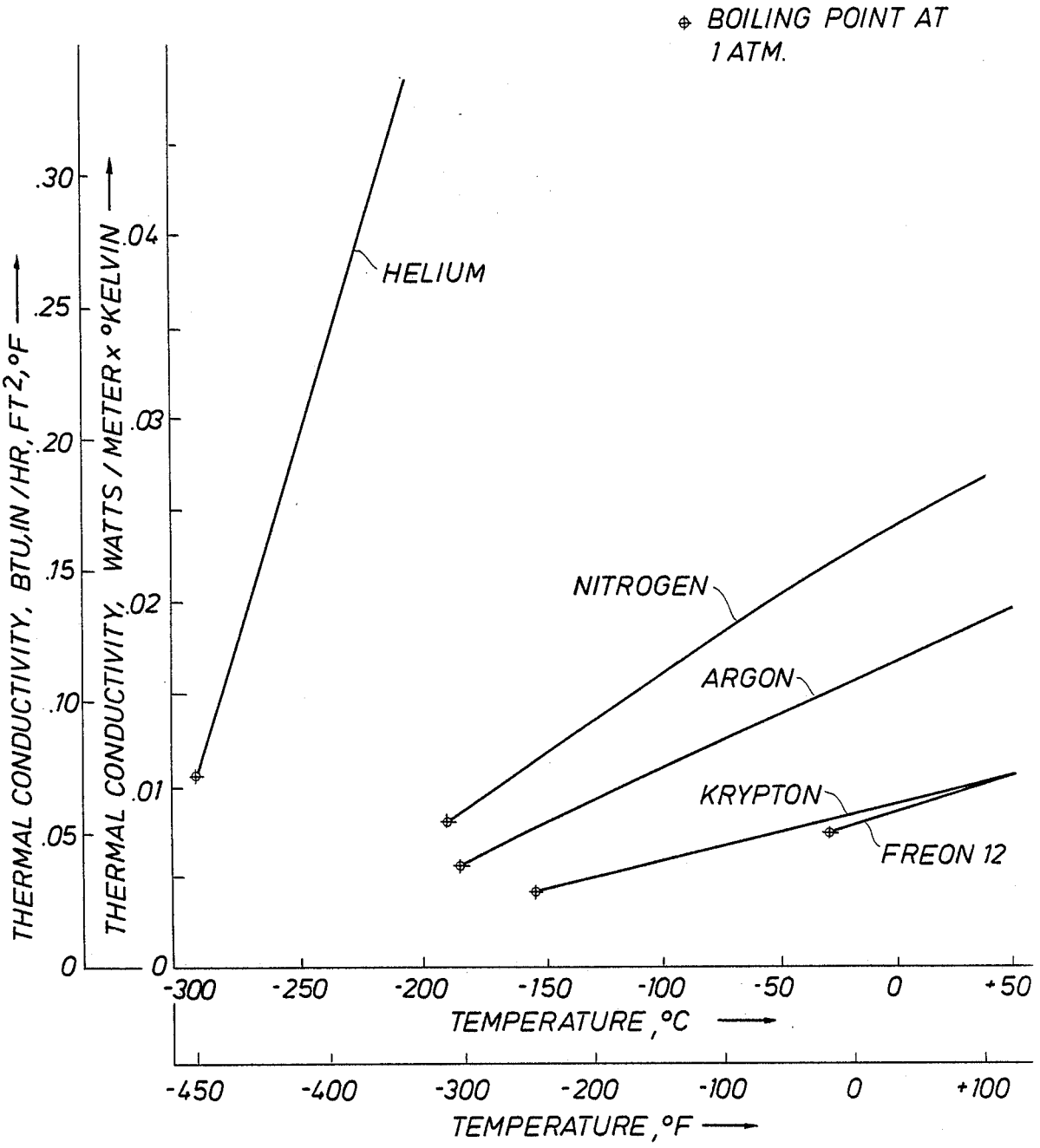
FIG. 5 is a graph showing the thermal conductivity of the gases shown in FIG. 4 at various temperatures.

Gas 16 should be carefully selected to optimize utility for each particular application. For LNG applications, gas 16 must not condense at the low temperatures at which LNG is transported, yet it should add only minimally to the thermal conductivity of the pipeline system. FIG. 3 and FIG. 4 may be used to show how gas 16 can be selected for a particular application. FIG. 4 is a chart showing pressure in pounds per square inch and Pascals at which selected gases will condense at −165° C., which is the temperature at which LNG is typically carried. The chart also shows the water depth in meters at which these pressures are found. FIG. 5 shows the thermal conductivities of the gases shown in FIG. 4 over a range of temperatures. Preferably, the gas or combination of gases selected for a given measure has the maximum molecular weight which is not subject to condensation at that pressure. Condensation should be prevented in order to maintain a constant gas pressure. In addition, condensation in open cell insulation increases the thermal conductivity of the material. If the thermal conductivity increases, a substance such as LNG will absorb heat from the surrounding insulation, causing further condensation and weakening of the insulation. Outer pipe jacket 18 may contract and weaken as the cold LNG temperature is carried through insulation material 12.

The molecular weight should be maximized since thermal conductivity generally decreases with an increase in molecular weight. The correlation between thermal conductivity and molecular weight is detailed by H. J. Huldy, "De involved van gas- en waterdampdoorlatendheid van isolatiematerialen op hun warmteisolerende eigenschappen" *Plastica,* Vol. 21, No. 9, (1968), pp. 368–376. For the reasons discussed above, it is important to minimize thermal conductivity.

By using FIGS. 4 and 5, it can be shown how a gas can be selected for use in a pipeline to be installed at a certain depth. At 300 feet (91.4 meters), the external pressure on a pipeline will be 12.9 pounds per square inch (0.896 Pa). Thus, gas 16 in the annulus must be pressurized to a value larger than 129.9 psi (0.896 Pa). By looking at FIG. 5, it can be seen that of the gases shown, nitrogen, a helium and nitrogen mixture, and a nitrogen and argon mixture can be used. A nitrogen and argon mixture will have the lowest thermal conductivity, and is thus preferred. This mixture should have as much argon as can be used without condensation.

It is not intended that the choice of gases used for gas 16 be limited to those shown in FIGS. 4 and 5. The gas selected for gas 16 should be chemically inert with respect to the pipeline, jacket, and insulation materials.

Thus, the present invention provides an improved pipeline system capable of withstanding elevated external pressure. In an insulated pipeline system embodying the pressure. In an insulated pipeline system embodying the invention, water or water vapor will be prevented from penetrating the insulation and thus increasing its thermal conductivity or destroying it mechanically. Even if outer jacket 18 develops a leak, the elevated pressure of gas 16 can keep water from penetrating the system until the leak can be repaired.

While this invention is especially well suited for submarine liquefied natural gas pipeline systems, and is discussed with reference to such uses, the invention may be embodied in pipeline systems to increase the ability of such system to withstand elevated external pressures. Other means and techniques can be employed without departing from the scope of the invention defined in the following claims.

I claim:

1. A pipeline system capable of withstanding an external pressure, comprising:

a pipe;

an outer pipe jacket surrounding and spaced from said pipe to define an annulus;

insulation material located in said annulus so as to encase said pipe; and a volume of gas which is chemically inert with respect to said pipe, said pipe jacket, and said insulation material located in said annulus at a pressure greater than the external pressure on said jacket, said gas selected so that it will not condense at its pressure in the system while adding minimally to the thermal conductivity of the system.

2. The pipeline system of claim 1 further comprising a vapor barrier encasing and adhering to said insulation material to prevent said volume of gas from penetrating said insulation material and said pipe.

3. The pipeline system of claim 1 wherein said gas is supplied and maintained in said annulus at a selected pressure by a supply tank, a pressure regulator, and a gas flowmeter.

4. A pipeline system capable of withstanding an external pressure, comprising:

a pipe;

insulation material encasing said pipe;

a vapor barrier encasing and adhering to said insulation material to prevent said volume of gas from penetrating said insulation material and said pipe;

an outer pipe jacket surrounding and spaced from said pipe to define an annulus; and a volume of gas which is chemically inert with respect to said pipe, said pipe jacket, and said insulation material located in said annulus having a pressure greater than the external pressure incident at the exterior surface of said jacket, said gas selected so that it will not condense at its pressure in the system while adding minimally to the thermal conductivity of the system.

5. The pipeline system of claim 4 wherein said gas is supplied and maintained in said annulus at a selected pressure by a supply tank, a pressure regulator, and a gas flowmeter.

* * * * *